United States Patent [19]
Monnot et al.

[11] Patent Number: 5,432,618
[45] Date of Patent: Jul. 11, 1995

[54] METHOD AND DEVICE FOR THE CERTIFICATION OF MESSAGES SENT BY FACSIMILE TRANSMISSION

[75] Inventors: Jérôme Monnot, Aix en Provence; Jean Sureaud, Le Beausset, both of France

[73] Assignee: Gemplus Card International, Gemenos, France

[21] Appl. No.: 931,821

[22] Filed: Aug. 18, 1992

[30] Foreign Application Priority Data

Sep. 12, 1991 [FR] France ................ 91 11275

[51] Int. Cl.$^6$ ............... H04N 1/32; H04M 11/00
[52] U.S. Cl. .................. 358/435; 358/438; 379/100
[58] Field of Search ................ 358/400–405, 358/407, 434, 435, 438, 440, 470; 379/100

[56] References Cited

U.S. PATENT DOCUMENTS

| | | | |
|---|---|---|---|
| 4,672,459 | 6/1987 | Kudo | 358/257 |
| 4,759,053 | 7/1988 | Satomi et al. | 379/100 |
| 4,941,170 | 7/1990 | Herbst . | |
| 4,960,981 | 10/1990 | Benton . | |

FOREIGN PATENT DOCUMENTS

| | | |
|---|---|---|
| 2647289 | 11/1990 | France . |
| 61-046553 | 8/1984 | Japan . |
| 2131666 | 5/1990 | Japan . |
| 8400229 | 1/1984 | WIPO . |

OTHER PUBLICATIONS

Research Disclosure No. 302, Jun. 1989, Havant GB A method for Prevention of Unauthorized duplication of Documents, pp. 461–462 (4 pages).

*Primary Examiner*—Vit W. Miska
*Attorney, Agent, or Firm*—Roland Plottel

[57] ABSTRACT

A method that enables the certification, at reception as well as at transmission, of messages sent by facsimile includes writing characteristic elements of a message in a rectangular box at the head of this message. A certifier device is used to decode alphanumerical characters of this box, encrypt them, and fashion an alphanumerical seal which is transmitted on the line of the facsimile machine with the standard code of facsimile transmission signals. At reception, the seal appears at the bottom of the message while the box appears always at the top of the message. To authenticate this seal, the receiver may approach an information retrieval center which will carry out the encoding operation on the contents of the box and compare the result with the seal to authenticate the message. When both ends are equipped, the receiver facsimile machine sends the sender facsimile machine an acknowledgment of receipt including the contents of the seal which is itself encoded, thus enabling the sender to authenticate the reception in the same way as the receiver has authenticated the received message. It enables a message transmitted by fax to be given the same legal quality as a message transmitted by telex.

12 Claims, 3 Drawing Sheets

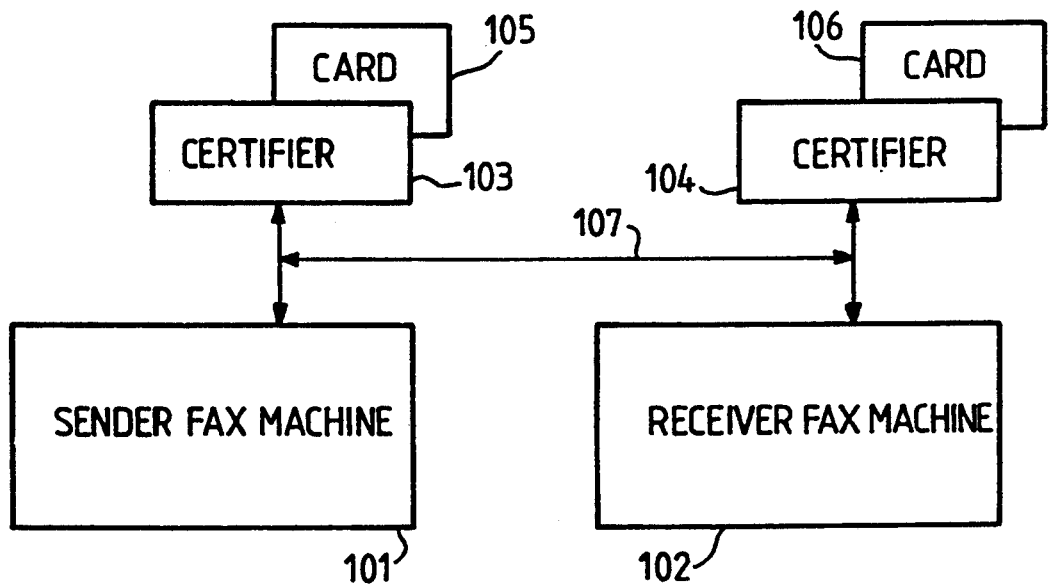
FIG_1
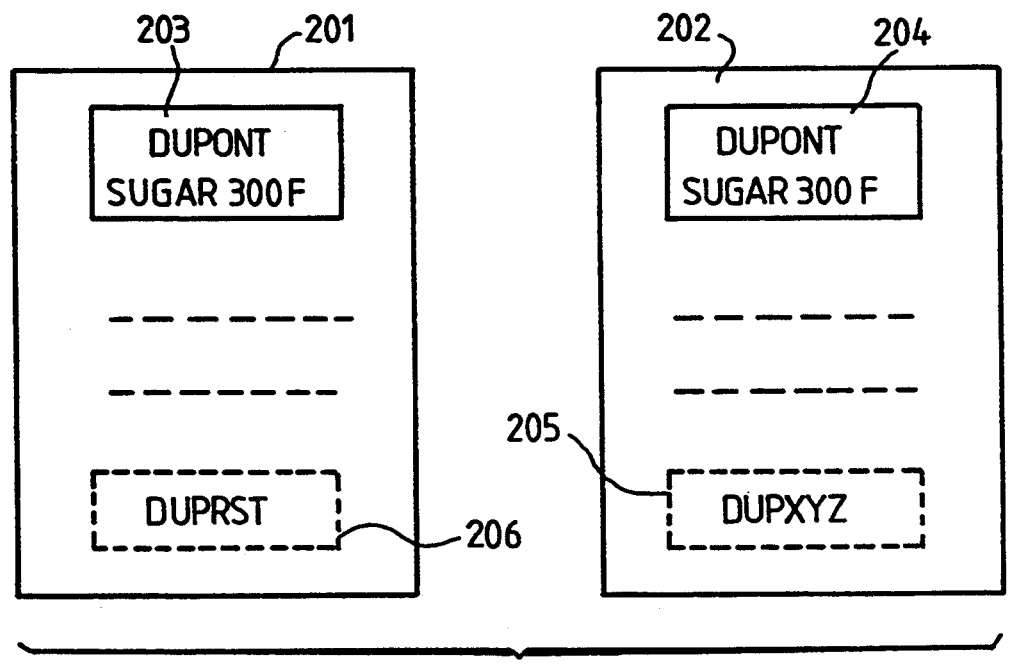
FIG_2

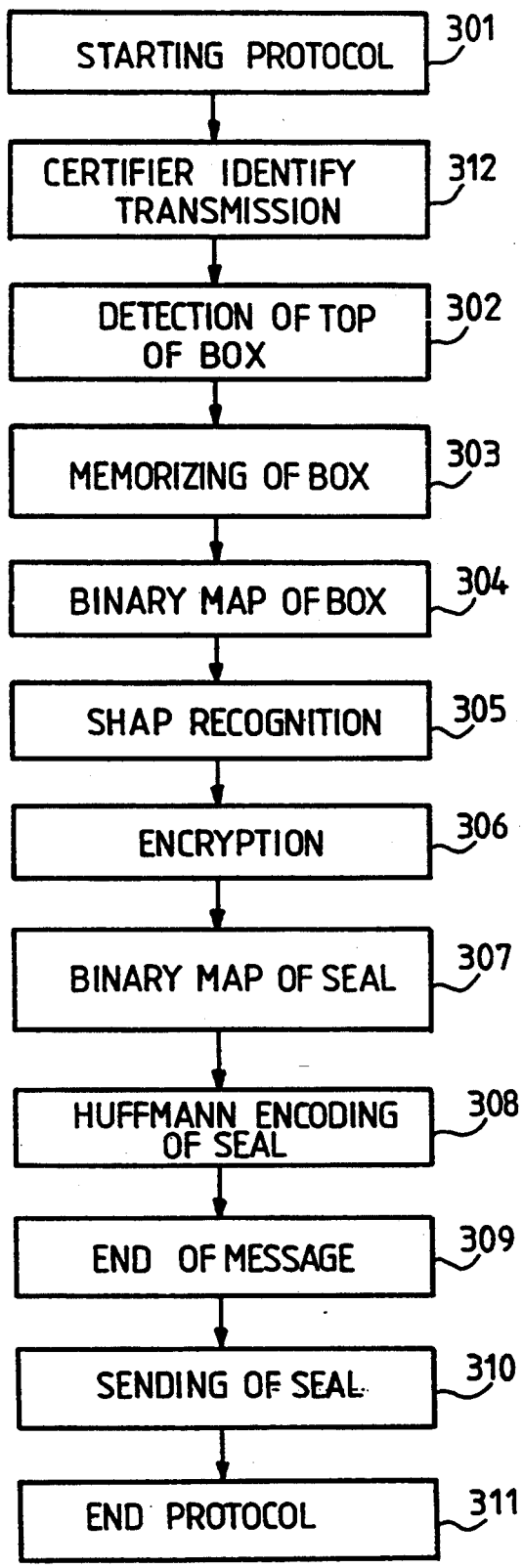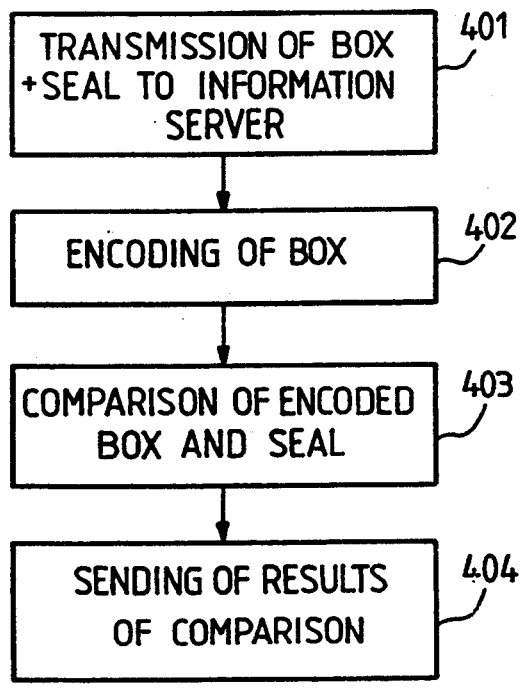

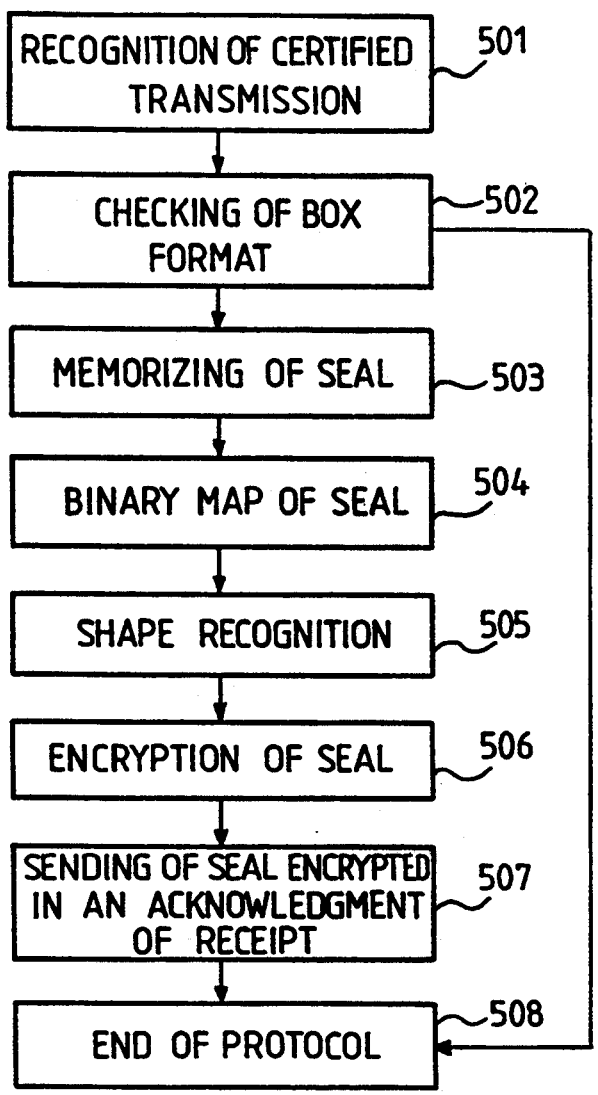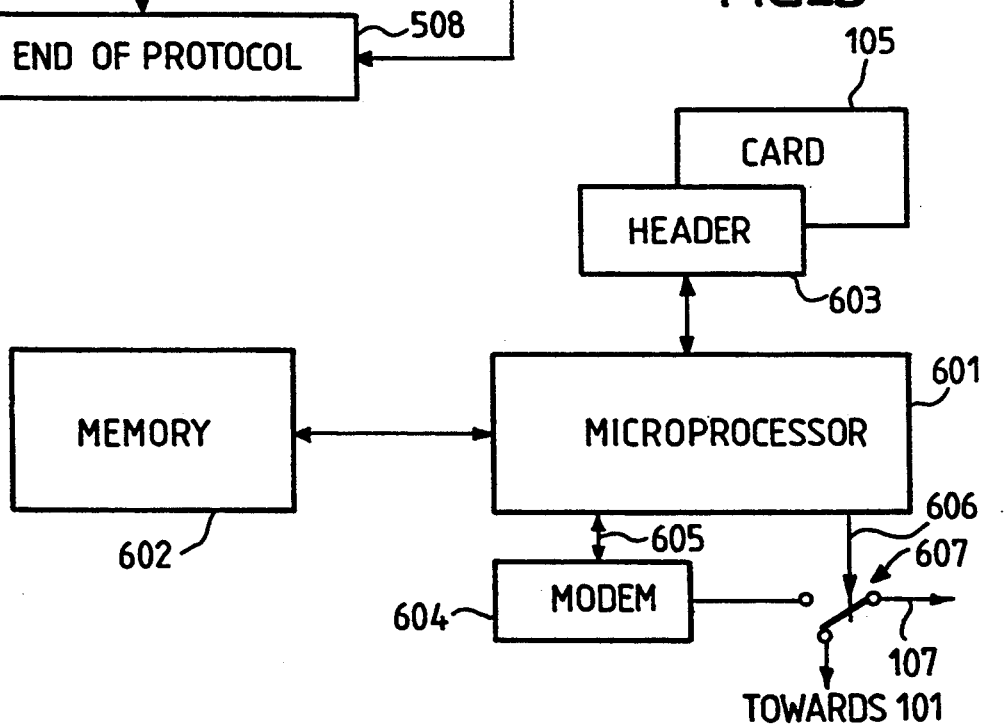

METHOD AND DEVICE FOR THE CERTIFICATION OF MESSAGES SENT BY FACSIMILE TRANSMISSION

BACKGROUND OF THE INVENTION

1. Field of the Invention

The present invention relates to methods that can be used to certify, i.e. to authenticate the messages transmitted by means of telecopiers or facsimile machines on telephone lines of the dial network. It also relates to devices enabling this method to be implemented.

2. Description of the Prior Art

Facsimile transmission is a method that is becoming increasingly widespread and enables the contents of a sheet containing textual material, both typewritten and handwritten material and even figures, to be transmitted from one place to another anywhere in the world by using the dial telephone or public telephone network. This method, which is also known as telefax (or fax for short) consists in analyzing the surface of the sheet that is sent, according to a system of scanning that is similar to a television scanning, and in transmitting the contents of the scanned lines dot by dot in encoding the luminous value of each dot. Roughly speaking, it may be said that a dot with a value of zero corresponds to a white dot and a dot with a value of 1 corresponds to a black dot. At reception, this scanning is reproduced, with the values of the dots, on a sensitive paper which therefore restores an exact image of the original, apart from the grid-related errors.

Since this method enables the transmission of signatures, it might be thought that a document transmitted by this method is sufficiently authentic in legal terms. This is not yet the case for it is, in fact, likened to a photocopy which, as is known, cannot be taken into account in a court of law. Its legal value by itself is insufficient. Besides, the only proof that the sender has of reception consists of the brief contents of a short acknowledgment of receipt, indicating that the copy has undoubtedly been received somewhere, in principle at a place corresponding to the number indicated at the top of the fax.

It is known, on the contrary, that a telex document has far greater legal authenticity and is fully accepted by the courts as a means of proof for both the sender and the receiver. Unfortunately, telex transmission is subject to major limitations. It can be used to transmit only texts using capital letters with a reduced number of punctuation signs, and has no graphic capacity. Besides, telex subscription rates are relatively steep, and it is furthermore necessary to have a particular machine available which cannot be used appropriately except by relatively specialized staff.

There is therefore a major need to make it possible to obtain the same legal authenticity for facsimile documents as for documents sent by telex while at the same time, naturally, enjoying the particular advantages that the fax method has over the telex method.

SUMMARY OF THE INVENTION

To resolve this problem, the invention proposes a method for the certification of messages sent by facsimile transmission, wherein:

an insert or box comprising characteristic alphanumerical data elements is written at the head of the message to be transmitted;

on the sender side, signals corresponding to the sending of this box are decoded;

the contents of the box thus decoded are encrypted to produce a certification seal, and towards the end of the transmission of the message, signals encoded according to the facsimile transmission standard are transmitted to the receiver in order to print said seal at the bottom of the received message.

BRIEF DESCRIPTION OF THE DRAWINGS

Other specific features and advantages of the invention shall appear clearly from the following description, given by way of a non-restrictive example and made with reference to the appended drawings, of which:

FIG. 1 shows a schematic drawing of a certifier system according to the invention;

FIG. 2 shows the sheets transmitted and received with this system;

FIG. 3 shows a flow chart of the steps of the method of the invention;

FIG. 4 shows a flow chart of a step of authentication of the acquired certification;

FIG. 5 shows a method according to the invention with acknowledgment of receipt;

FIG. 6 shows the structure of a certifier implementing the method of the invention.

MORE DETAILED DESCRIPTION

The system shown in its most complete form in FIG. 1 includes a sender fax machine 101 that transmits a message, for example on a sheet 201 shown in FIG. 2, towards a receiver fax machine 102. The received document is, for example, a sheet 202 shown on this same FIG. 2. Connected in parallel to the telephone line 107 which connects these two fax machines, there is a certifier 103 at transmission and a certifier 104 at reception. These certifiers preferably use encryption means comprising, for example, a chip card 105 at transmission and a chip card 106 at reception. It is known that chip cards are presently the most practical means enabling the possession of a removable key used for requirements of encoding or encryption with a view to security. It is possible, nevertheless, to use other systems such as, for example, a keyboard by which a code is directly entered without even doing any encryption.

According to the invention, the message to be transmitted, borne on a sheet 101, systematically comprises a box 203, formed for example by a rectangular frame having a number of inscriptions within it. If the box has no frame, it has at least a standardized location designed for the certification. The inscriptions in the box are alphanumerical and comprise, for example, an invariable part such as, in this example, DUPONT, which represents the identification of the sender, and variable parts which are left to the choice of the party drafting the message and preferably comprise the essential elements of the message which is to receive the certification. In this example, we have written SUGAR and 300 F (francs) which would correspond, for example, to the placing of an order, the essential element of which is that it pertains to sugar valued at 300 francs.

The sheet 201 is introduced into the sender fax machine 101 so that the side having the box 203 is transmitted first. The sender fax machine 101 then makes contact with the receiver fax machine 102, by exchanging first of all a standardized or well-known identification protocol. Then the transmission begins. The signals corresponding to the contents of the sheet 201 are sent on the transmission line 107. These signals correspond to a series of 1s and 0s encoded by a modem. They are generally subjected beforehand to a compression algorithm, which is itself also quite standardized, for example a HUFFMANN type algorithm, which makes it possible to accelerate the transmission in preventing, for example, the routine transmission of lines that are all white and lines that are all black.

When the signals corresponding to the box 203 are sent on the line, they are at the same time transmitted to the certifier 103 which has been started up beforehand, during the identification protocol, and which therefore waits for the arrival, at an appropriate moment, of the signals corresponding to the upper horizontal edge of the box. This moment may be synchronized by detecting the passage of the upper edge of the sheet 201 and by measuring the speed of progress of this sheet.

From this instant onwards, which corresponds to a truly characteristic break of the transmitted signals, these signals are memorized in the certifier until all the signals corresponding to the box with its contents have been transmitted on the line 107. It will be observed that, in order to obtain the most efficient possible functioning of the invention, it may be appropriate to write nothing on the zone going from the upper part of the sheet 201 up to the lower part of the box 203. The certifier therefore includes in memory, encoded by 1s and 0s, the drawing of the box with its frame and its contents.

The certifier, which includes a data-processing computer system, first of all decodes the contents of the box by using a shape-recognition algorithmic system. Different algorithms may be used, some of which work directly on the basis of compressed signals according to the compression algorithm of fax systems. However, the simplest method, for the explanation, consists of the reconstitution, initially, in the memory of the data-processing system of the certifier 103, of the box in the form of a binary map by the application of the compression algorithm in reverse to decompress the signals sent by the fax machine. Preferably, the bits corresponding to the frame of the box are used as a synchronization system. Indeed, these bits are quite recognizable and they correspond to alignments on the sheet 201. Once there is a binary map of the contents of the frame, it is possible to apply one of the shape-recognition algorithms, several variants of which are known in the prior art.

A recognition algorithm such as this recognizes both fixed alphanumerical inscriptions such as DUPONT and variable ones such as SUGAR 300 F. The result of this recognition, which may very well relate to digits or letters written by hand, provided that the handwriting is a relatively standard type, is memorized in the form of a sequence of binary codes, far shorter than the cartographic content of the box as obtained from the line signals.

This short sequence of binary codes then preferably undergoes a cryptographic encoding. This cryptographic encoding is with an identification code contained in the card 105. This identification code represents a safeguarded element of the system. It is normally assigned by the authority managing the telephone network to which the fax machine 101 is connected. This card 105 is normally in the possession of the user who puts it into the reader of the certifier only for the requirements of certified transmission. Each certification leads to the obliteration of a prepayment unit. Payment for this certification is in this case made in advance to the authority that has issued it. The encryption algorithm is, for example, an RSA or DES type algorithm. The result of this cryptographic encoding may correspond to a sequence of binary words. One of these words may be intelligible: for example DUP in the example described. Another part may be unintelligible, and may correspond to a sequence of letter and/or digits, such as XYZ in the example described, apparently meaning nothing to the reader.

These characters DUPXYZ are then put in the form of a binary map. This binary map represents the certification seal 205 which shall be described further below. This character/binary map encoding corresponds to an encoding that is the reverse of the shape-recognition encoding. However, it is easier since it corresponds actually to an operation that is the same as the one used for example to make a display on a display monitor.

When all these processing operations are carried out, a procedure that takes only a few seconds with modern computer systems with respect to both the microprocessor and the algorithms, the binary map of the seal is memorized in the certifier up to time when the transmission of the message (which has been done in the meantime) has reached a point which is a few centimeters from the bottom of the sheet 201. In practice, this processing operation comprising detection—(compression-decompression)—shape recognition—encryption of the seal—preparation of the binary map takes about one second.

Before the bottom of the page is reached, the certifier sends, on the line 207, in parallel with the signals from the fax machine 101, the signals corresponding to the binary map of the seal, appropriately encoded with the fax compression algorithm. It is possible, however, to use various methods and, for example, to substitute the transmission of the certifier 103 for that of the fax 101 in the time that the seal is transmitted.

At reception, the fax machine 102, in the most usual way, receives the message comprising the box 204 followed by the message itself and, at the end of this message, a seal 205, DUPXYZ, which gets printed at the bottom of the page 202 whereas it was not printed on the page 201. The seal 205 may also be framed by a box since, with the transmission being over, the fax machines exchange their end-of-page signals and the communication may stop at this point, unless there are no additional pages to be transmitted for which the method according to the invention may be applied in the same way.

The addressee of the message therefore has, in his possession, a sheet such as 202 comprising, at the top, the box 204 and, at the bottom, the seal 205 with the text of the message between the two. The presence of the box 204 and of the seal 205 inform him that this is a message transmitted by certified means, the authentication of which is given to him by the seal 205. He therefore has, in his possession, a message that may be considered to be an original document binding on the addressee of this message.

However, it is possible to conceive of a situation where a sender, acting in bad faith, sends a message such as this with a right box 203 and a bogus seal 206. This bogus seal 206 is shown in dashes in the sheet 201 sent. The seal 206 has no meaning since at least a part of this seal, the letters RST in the example, cannot correspond to the contents XYZ of the box 205 which are in a regularly encrypted form and cannot be decrypted by the fraudulent sender.

If the addressee wishes to have a real authentication of the message, he would naturally be unable to do it himself since the decryption is not known to him. To this end, according to an improvement of the invention, the receiver approaches an information retrieval center, for example a central department of the Postal Authority, and gives it firstly the contents of the box 204 (DUPONT SUGAR 300 F in the example) and, secondly, the contents of the seal (DUPXYZ in the example) and finally the sender's identity in plain form. This information retrieval center possesses encryption algorithms and all the keys of the senders, and it may then, by encrypting the contents of the box with the key of the transmitter, give an official authentication of the box and hence of the message if the seal is the same as the seal 205. Different methods may be used for communication with this information retrieval center, for example by using the same methods as those presently used to certify the authorization of payments by credit card.

The simplest system may consist in telephoning an operator and informing him verbally of the contents of the box and of the seal and the identity of the sender. The operator then enters these contents into a computer system that contains the encryption algorithms and the keys, and he provides the results of his search, again verbally. These searches cannot be confirmed by letter.

A more elaborate method may consist quite simply in retransmitting the fax message received to the information retrieval center. This information retrieval center will work automatically, like the certifier 103, in carrying out an analysis of the box to obtain binary maps of this box and of the seal.

The method of certification during the transmission from the fax machine 101 to the fax machine 102 corresponds to the flow chart of FIG. 3, and the method of verification at the information retrieval center corresponds to the flow chart of FIG. 4.

The method described until now corresponds to the least elaborate version of the invention wherein the certification is done only with respect to the sender with verification by the receiver. The sender is provided with the necessary means and the receiver has a simple fax machine. It is not possible to carry out an authentication with respect to the receiver because the latter is not provided with the special means of the invention. This version can be used at an initial stage when it is not conceivable that all the fax machines will be provided with these means. It can be seen, nevertheless, that the invention already procures appreciable results when the sender fax machine is provided with these means. These means enable the invention to be implemented gradually, as and when the fax machines are fitted out, without waiting for everybody to have the relevant equipment.

In a second, more complete version corresponding to the totality of FIG. 1, the receiver fax machine is provided with means that are the same as those of the sender fax machine, namely a certifier 104 that can also read a chip card 106 containing an encryption key. Simply, the programming of the certifier 104 enables it, at reception, to fulfil functions that supplement those described further above. These supplementary functions are naturally programmed from the outset in the certifier 103 so that, when everybody is provided with machines of this kind, the most elaborate version of the invention can function without any modification of the instrument system.

In this more elaborate version, it is therefore provided that the sender certifier 103 will add a signal, for example a binary word, to the standard protocol at the start of the line connection between the two fax machines. This signal gets inserted in a free space between the different data elements that are exchanged and are designed to match the two faxes with each other. This corresponds to the step 312 of FIG. 3.

This signal is recognized in the step 501 of the flow chart of FIG. 5 which represents the dispatching of the acknowledgment of receipt. The receiver fax machine 102, knowing that it must receive a certified message, therefore begins by verifying the arrival of the box in a header in a step 502. This enables it to ascertain that the transmission is in good condition through a check, the thoroughness of which varies according to the possibilities of the shape-recognition algorithm, this check being made for example on the straightness of the rectangle forming the surroundings of the box. In this way, if the rectangle is excessively deformed, indicating poor transmission, the receiver will take account of this point when sending the acknowledgment of receipt as shall be seen hereinafter.

The reception of the message then takes place normally and, when the seal, which it may be recalled, is always at the same position on the sheet 202, is reached, the certifier 104 memorizes the compressed signals corresponding to the transmission of this seal in a step 503. These memorized seals are then decompressed, thus making it possible to obtain a binary map of the seal in the step 504, in the same way as a binary map of the box was obtained in the step 304 at the main transmission.

It is then possible to carry out a shape recognition of this binary map in a step 505. This makes it possible to obtain the sequence of characters forming the contents of the seal, i.e. DUPXYZ in the example, in plain form and no longer in graphic form.

The certifier 104 of the receiver then encrypts the contents of this seal DUPXYZ in adding its own identification thereto in a step 507. This step 507 is necessary to prevent any receiver from sending a false acknowledgment of receipt towards the sender. It is done according to the encryption key of the card 106.

The encrypted acknowledgment of receipt coming from this processing operation is then sent again towards the sender fax machine 101, in the form of a series of characters, for example in ASCII code, inserted in the standard acknowledgments of receipt of the fax. It is indeed known that the standard fax machines have a memory into which it is possible to introduce different information elements such as the name of the owner of the fax machine and his call number. These information elements are presently at the disposal of the owner and it often happens that he has blank spaces in their place. The most practical approach in the implementation of the invention will, indeed, be to leave blank spaces in the place of a part of these information elements. This gives the certifier space to transmit the encrypted elements that it has just defined towards the fax 101. It can be seen that this transmission is far easier since there is no longer any need to go again through the procedure of a binary map followed by a compression for the information elements in question are directly transmitted in alphanumerical form on the line, by means of the standard acknowledgment of receipt provided on all fax machines.

After this step 507, a final step 508 corresponds to the end protocol by which the two fax machines get disengaged from the connection. For the purpose of the explanation, the transmission of the acknowledgment of receipt in the step 507 has been separated from that of the end protocol in the step 508. However, it is common practice to consider the acknowledgment of receipt to form part of the end protocol.

Furthermore since, at this instant, there is information available for checking the box format obtained in the step 502, this information may be introduced into the end protocol at the step 508 since this protocol effectively includes the possible transmission of an information element according to which the transmission has been poorly received. This information element is presently obtained from the detection of various mishaps of reception and the addition of this supplementary condition corresponds simply to a simple logic "OR" that can be obtained without any particular type of difficulty.

Hence, in its acknowledgment of receipt, the sender fax machine 101 receives, in addition to the words "copy well received" (as the case may be), a sequence of characters corresponding to the encrypting of the information elements contained in the box that it had sent previously and the identification of its correspondent. It may then have the contents of this sequence of characters verified with the information retrieval center in the same way as the possessor of the receiver fax machine had verified the validity of the seal that was sent with the information retrieval center. It will simply be necessary to see to it, in this case, that what the information retrieval center will retransmit will be not a signal of acquiescence but the contents of the acknowledgment of receipt properly decrypted.

FIG. 6 shows an exemplary embodiment of a certifier such as 103. This certifier 103 essentially comprises a microprocessor 601 provided with a memory 602 which contains the programs by which it can be made to work. A chip card reader 603 can be used to read the card 105 and to send the microprocessor various information elements and, especially, the keys needed for the operation of the encryption algorithm. The information elements, coming both from the fax machine 101 and from the line 107, are oriented towards the microprocessor by means of a switch 607 which makes it possible, depending on the needs of the sequence, to connect the line 107 with the fax machine 101 or with a modem 604 which makes it possible to convert the analog signals of the fax machine and of the line into digital signals capable of being understood by the microprocessor. This modem is of the reversible type, i.e. it transmits both the signals towards the microprocessor and the signals of the microprocessor towards the fax machine or the line by means of a link 605 which connects it to the microprocessor. This microprocessor comprises, inter alia, a control line 606 which can be used to make the switch 607 work.

What is claimed is:

1. A method for the certification of the messages sent by facsimile transmission, comprising the steps of:
   writing an insert or box comprising characteristic alphanumeric data elements at the head of the message to be transmitted,
   encoding the message with the insert or box according to the facsimile transmission standards,
   decoding on the sender side signals corresponding to the sending of the insert or box,
   encrypting the contents of the insert or box thus decoded to produce a certification seal, and
   transmitting to a receiver towards the end of transmission of the message signals encoded according to the facsimile transmission standard in order to print said seal at the bottom of the received message.

2. A method according to claim 1, wherein the step of writing includes inscribing the insert or box within a frame with a dimension that is constant and identical for all messages.

3. A method according to either of the claims 1 or 2, further comprising the steps of converting the contents of the insert or box into a binary map,
   applying a shape recognition method to said binary map, enabling retrieval of alphanumeric data elements contained therein.

4. A method according to claims 1 or 2, further comprising the step of converting the encrypted contents of the insert or box into a binary map designed to be sent dot by dot according to the facsimile transmission code.

5. A method according to claims 1 or 2, further comprising the steps of:
   sending the contents of the insert or box, the seal and an identification of the transmitter to an information retrieval center,
   comparing at the information retrieval center the seal with the contents of the insert or box, encoded beforehand with the same code as at transmission, and
   sending from the information retrieval center the results of the comparison to the receiver to thereby authenticate the seal.

6. A method according to claims 1 or 2, further comprising the steps of:
   decoding signals corresponding to the reception of the seal on the receiver side,
   using the contents of the seal to produce an acknowledgment of receipt,
   sending the alphanumeric data elements representing the acknowledgment of receipt to the sender after the end of reception of the message and before the end of transmission, and
   printing the acknowledgment of receipt in the standard acknowledgment of receipt of the sender facsimile machine to thereby authenticate reception on the sender side.

7. A method according to claim 6, further comprising the step of checking the format of the received insert or box in order to send a signal of poor reception if this format is deformed beyond a certain limit.

8. A method according to claims 1 or 2, wherein said encrypting step includes encrypting the contents of the insert or box with other elements to produce the seal or acknowledgment of receipt.

9. A method according to claims 1 or 2, further comprising the step of providing a chip card in the facsimile machine used for facsimile transmission and counting out accounting units in the chip card at each certification.

10. A method for certifying the sender of a facsimile of a transmitted facsimile message comprising the steps of:
   (a) adding at a predetermined location an inscription containing characters to the message to be sent by facsimile,
   (b) beginning scanning the inscription and the message,
   (c) applying a compression algorithm to the scanned output, (d) detecting the inscription,
(e) applying a decompression algorithm to the detected inscription,
(f) encrypting the detected inscription,
(g) applying a compression algorithm to the encrypted inscription,
(h) adding the compressed, encrypted inscription to the message, and
(i) sending the message with the inscription and the encrypted inscription.

11. The method of claim 10, wherein the inscription is at the beginning of the message, and the encrypted inscription is at the end of the message, and the steps (b) through (h) are carried out while the inscription and message is being transmitted.

12. The method of claim 10, wherein said encrypting is made by use of a chip card, and each certification leads to an obliteration of a prepayment unit in said chip card.

* * * * *